No. 794,271.

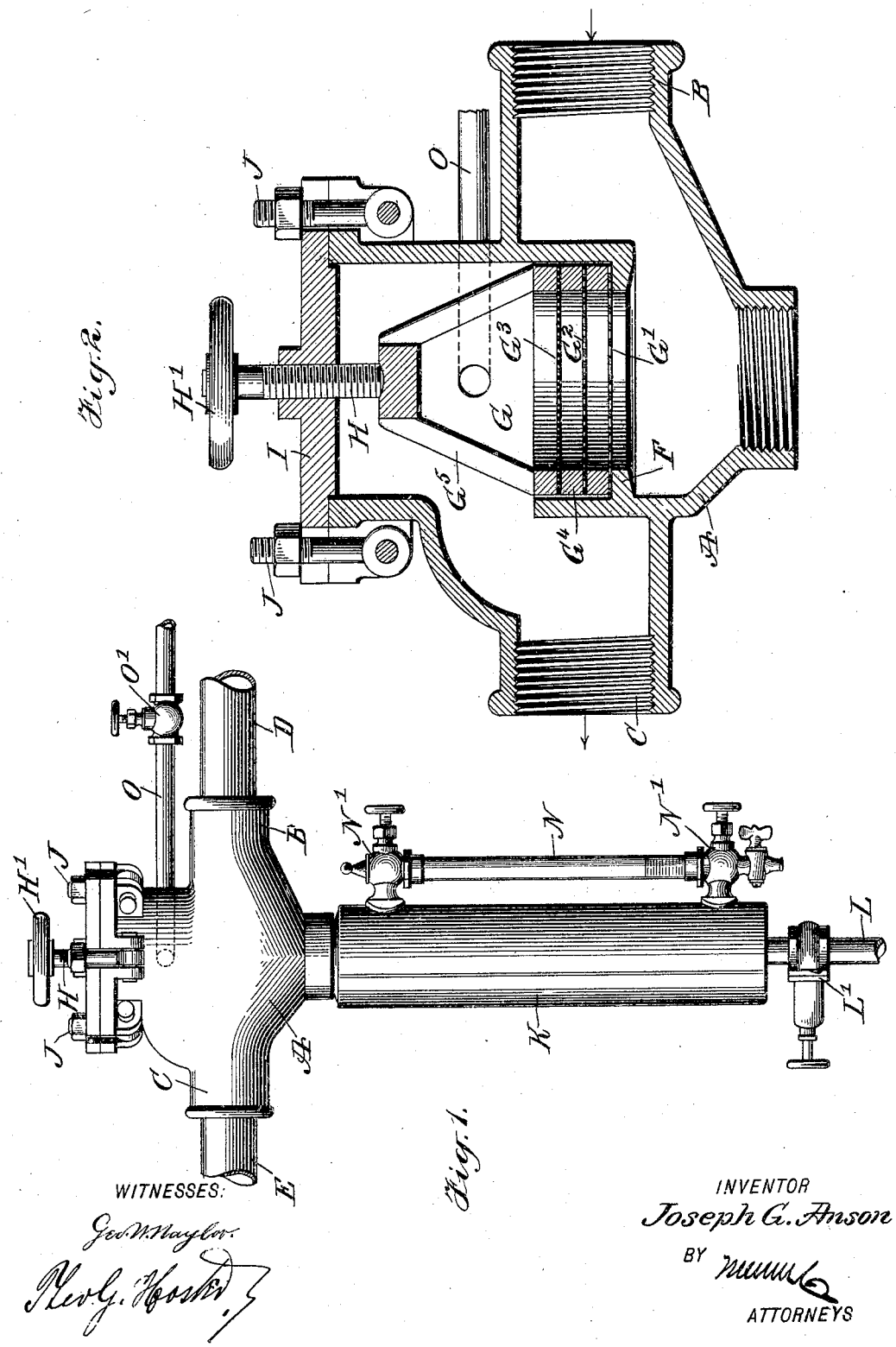

Patented July 11, 1905.

UNITED STATES PATENT OFFICE.

JOSEPH GEORGE ANSON, OF SAN FRANCISCO, CALIFORNIA.

STRAINER AND SEPARATOR.

SPECIFICATION forming part of Letters Patent No. 794,271, dated July 11, 1905.

Application filed July 11, 1904. Serial No. 216,098.

*To all whom it may concern:*

Be it known that I, JOSEPH GEORGE ANSON, a citizen of the United States, and a resident of San Francisco, in the county of San Francisco and State of California, have invented a new and Improved Strainer and Separator, of which the following is a full, clear, and exact description.

The object of the invention is to provide a new and improved strainer and separator more especially designed for use in steam-generating plants using crude oil as a fuel in the furnaces and the like and arranged to separate the water from the oil, to insure a thorough straining of the oil previous to the latter reaching the burners, and to allow quick and convenient cleaning of the device.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1 is a side elevation of the improvement, and Fig. 2 is an enlarged sectional side elevation of the same.

The casing A is provided at opposite sides with an inlet B and an outlet C, of which the inlet B is connected by a valved pipe D with a pump or similar device for forcing the oil to be treated to the burners held on the end of a valved pipe E, connected with the outlet C of the casing A.

Within the casing A, intermediate the inlet B and the outlet C, is formed a seat F for a strainer G to rest on, the said strainer being formed of a plurality of spaced sieves or screens $G'$, $G^2$, and $G^3$, located one above the other and having different-sized meshes, the largest-size-mesh sieve $G'$ facing the inlet B and the smallest-size sieve $G^3$ facing the outlet C. The sieves $G'$, $G^2$, and $G^3$ are held separated from each other by rings $G^4$, fastened together and forming a strainer-cage provided with a yoke $G^5$, engaged by the inner end of a screw-rod H to hold the strainer G firmly to its seat F within the casing A.

A screw-rod H screws in the removable cover I for the casing A, and the outer upper end of the said screw-rod is provided with a suitable hand-wheel $H'$ to enable the operator to conveniently turn the screw-rod H for the latter to engage or disengage the yoke $G^5$ of the strainer-casing. The cover I is attached to the casing A by eyebolts J, fulcrumed on the casing, as plainly illustrated in Fig. 2, and the cover I is located directly above the strainer G, so that when the cover is removed the strainer can be conveniently lifted out of the casing for repairs or other purposes.

From the bottom of the casing A, at the bottom of the inlet B and directly below the strainer G, depends a separating vessel K, into which drains the water separated from the oil previous to the latter passing to the strainer G. From the bottom of the vessel K leads a discharge-pipe L, provided with a suitable valve $L'$, and on the side of the vessel K is arranged a gage-glass N for indicating the amount of water that has accumulated in the vessel K. The gage-glass N is provided with the usual valves $N'$ to permit of cutting off the gage-glass from the interior of the vessel K whenever it is desired to do so.

Into the casing A leads a pipe O, provided with a valve $O'$ and connected with a boiler or other suitable source of steam-supply, the entrance end of the pipe O into the casing A being on the inlet side thereof, preferably directly above the top sieve $G^3$, as plainly shown in Fig. 2.

The operation is as follows: When the several parts are in the position illustrated in the drawings and the valves $O'$ and $L'$ are closed, the valves $N'$ are open and the pump is working. Then the oil is forced into the casing A, at the inlet side thereof, to allow the water carried along by the oil to separate from the latter, owing to its greater specific gravity, so that the water settles and accumulates in the vessel K, while the oil is forced successively through the sieves $G'$, $G^2$, and $G^3$ to prevent impurities in the oil from passing to the outlet side of the casing A. From the outlet side of the casing the strained oil passes by way of the pipe E to the burners to be burned, the result being that the burners are not liable to be clogged up, as the impurities have been removed from the oil.

When it is desired to clean the strainer and separator, it is necessary to stop the pump and to close the valves in the pipes D and E, as well as the valves N', after which the valves O' and L' are opened, so that steam can now pass from the boiler by way of the pipe O into the outlet side of the casing A, to then pass downward through the sieves $G^3$, $G^2$, and $G'$ to force the impurities adhering to the same downward into the vessel K, from which the water, as well as the impurities and the steam, are carried off by way of the pipe L. After the cleaning operation the steam is shut off by closing the valve O', and then the valve L' is closed, precaution, however, being taken that a small quantity of water remains in the bottom of the vessel K. The valves N' are then opened, as well as the valves in the pipes D and E, and the pump is now started to repeat the above-described operation—that is, to separate the water from the oil and to strain the oil previous to its passage to the burners.

In case the strainer G gets out of order it can be quickly removed from the casing A and repaired and replaced.

By having a plurality of sieves $G'$, $G^2$, and $G^3$ of different meshes and arranged as described it is evident that the coarser impurities are held back by the first sieve $G'$, the next coarser by the sieve $G^2$, and the next following by the sieve $G^3$, so that the sieves are not liable to clog up very quickly, as would be the case if only a single sieve of a very fine mesh were used.

Having thus described my invention, I claim as new and desire to secure by Letters Patent—

1. A strainer and separator, consisting of a casing having an inlet and outlet at opposite sides, an opening in its top closed by a removable cover, and a strainer-seat intermediate of the inlet and outlet and below the top opening, a strainer-cage on the seat of the casing, said cage containing a plurality of spaced sieves and provided with an upwardly-projecting yoke, a screw mounted in the cover and engaging the yoke of the cage to hold it on its seat, a separating vessel communicating with and depending from the bottom of the casing and having a discharge-pipe leading from its bottom, a gage-glass on the separating vessel, and steam-pipe opening into the casing at the inlet side thereof and directly above the uppermost sieve of the cage, substantially as herein shown and described.

2. A strainer and separator, comprising a casing having at opposite sides an inlet and outlet, an opening in its top closed by a removable cover, and a strainer-seat directly below the top opening and intermediate of the inlet and outlet, a strainer-cage on the seat of the casing and containing a plurality of sieves of different-sized mesh, said cage being provided with an upwardly-projecting yoke, a screw working in the cover and engaging the yoke of the cage, and a separating vessel communicating with the bottom of the casing, substantially as described.

3. In a strainer and separator, a casing having in its opposite sides an inlet and outlet, an opening in its top closed by a removable cover, and a strainer-seat directly below the said opening and intermediate of the inlet and outlet, a strainer-cage on the seat of the casing and containing a plurality of sieves, said cage being provided with an upwardly-projecting yoke, and a screw in the cover and engaging the yoke of the cage, substantially as described.

4. In a strainer and separator, a casing having an opening in its top closed by a cover, an inlet and outlet and a seat intermediate the inlet and outlet, a strainer-cage on the seat and containing a plurality of spaced sieves of different-sized meshes, and means carried by the cover and engaging the strainer-cage to hold it on the seat.

5. In a strainer and separator, a casing having an inlet and outlet, a strainer-seat intermediate of the inlet and outlet, and an opening in its top closed by a cover, a strainer-cage on the seat and provided with a plurality of spaced sieves of different meshes, the largest-mesh sieve facing the inlet, and a screw carried by the cover and engaging the strainer-cage to hold it on the seat.

6. A strainer and separator, comprising a casing having an inlet and outlet, and a strainer-seat intermediate of the inlet and outlet, a strainer on the seat and containing a plurality of sieves of different meshes, means for holding the strainer on the seat, a steam-pipe entering the casing above the uppermost sieve of the strainer, and a separating vessel secured to the bottom of the casing directly below the strainer to receive the water separated from the oil previous to the latter passing to the strainer.

In testimony whereof I have signed my name to this specification in the presence of two subscribing witnesses.

JOSEPH GEORGE ANSON.

Witnesses:
HENRY MEYER,
ED E. PANABAKER.